United States Patent [19]
Umeda et al.

[11] Patent Number: 5,835,209
[45] Date of Patent: Nov. 10, 1998

[54] RELATIVE-ANGLE DETECTION APPARATUS

[75] Inventors: Yuichi Umeda; Masatoshi Uchio; Kazuyoshi Yamagata, all of Fukushima-ken; Junichi Saito, Miyagi, all of Japan

[73] Assignee: Alps Electric Co., Ltd., Tokyo, Japan

[21] Appl. No.: 720,832

[22] Filed: Oct. 3, 1996

[30] Foreign Application Priority Data

Oct. 12, 1995 [JP] Japan ................................. 7-264384

[51] Int. Cl.⁶ ........................... G01B 11/26; G01C 1/00
[52] U.S. Cl. .......................... 356/141.3; 356/141.5; 356/139.03
[58] Field of Search ................. 356/141.1, 141.3, 356/141.5, 139.03

[56] References Cited

U.S. PATENT DOCUMENTS

| | | | |
|---|---|---|---|
| 3,021,749 | 2/1962 | Merlen | 356/141.3 |
| 3,907,435 | 9/1975 | Roodvoets | 356/141.3 |
| 4,291,977 | 9/1981 | Erdmann et al. | 356/141.3 |
| 4,560,270 | 12/1985 | Wiklund et al. | 356/141.1 |
| 4,712,915 | 12/1987 | Kosakowski et al. | 356/141.1 |
| 4,808,064 | 2/1989 | Bartholet | 356/141.3 |

*Primary Examiner*—Stephen C. Buczinski
*Attorney, Agent, or Firm*—Brinks Hofer Gilson & Lione

[57] ABSTRACT

A relative-angle detection apparatus which has an infrared-signal transmitting unit and an infrared-signal receiving unit. The transmitting unit includes a first light-emitting device array formed of a plurality of light-emitting devices disposed in a direction substantially coinciding with the fiducial axis for angle detection, and a second light-emitting device array formed of a plurality of light-emitting devices located to be slightly angled in the different directions with respect to the axis. The devices of the first light-emitting device array generate a continuously-output first infrared signal in which an infrared signal is intermittently modulated by a first frequency and also modulated by a second frequency higher than the first frequency. The devices of the second light-emitting device array generate a second infrared signal in which an infrared signal is modulated by the first frequency and also divided into a plurality of signals so as to be output at different timings. The receiving unit detects and amplifies the first frequency contained in the first and second infrared signals and executes signal-processing on the amplified first frequency, thereby detecting the angle of the transmitting unit relative to the receiving unit.

5 Claims, 6 Drawing Sheets

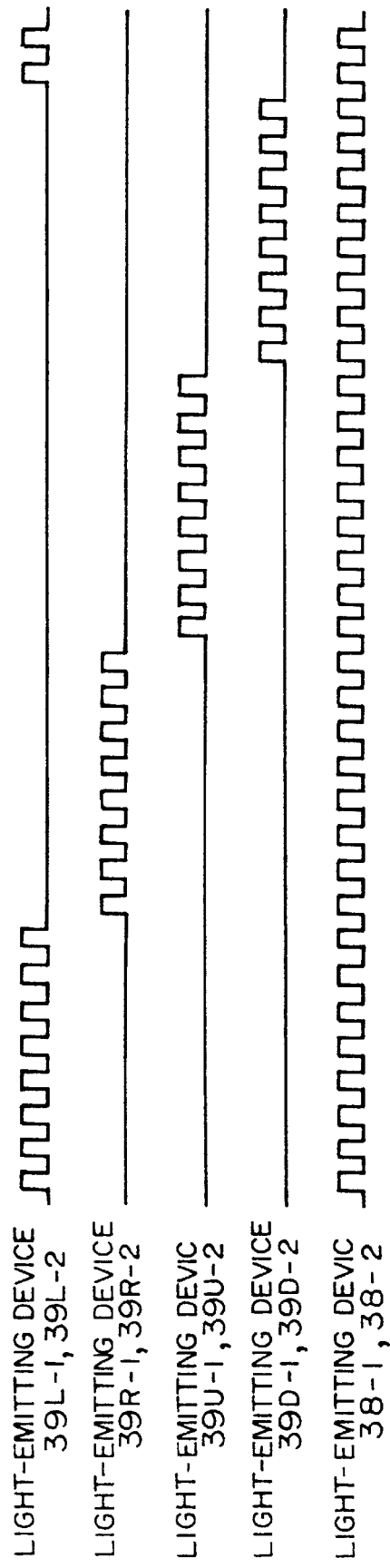
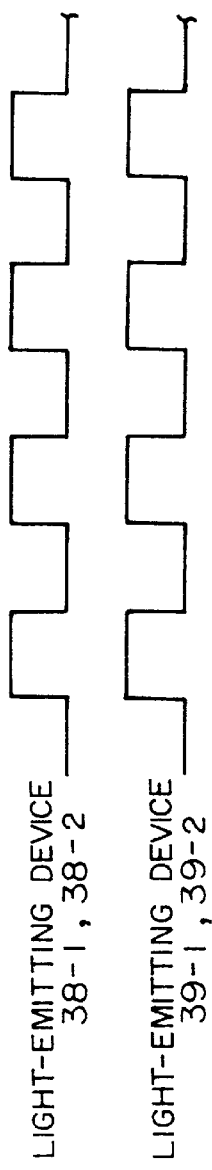

RELATIVE-ANGLE DETECTION APPARATUS

BACKGROUND OF THE INVENTION

1. Field of the Invention

The present invention relates to a relative-angle detection apparatus. More specifically, the invention relates to a relative-angle detection apparatus having an infrared-signal transmitting unit formed of a first light-emitting device array disposed in a direction along the fiducial axis used for angle detection and second light-emitting device arrays located in different directions slightly displaced and angled with respect to the fiducial axis, so that infrared signals transmitted from the device arrays are supplied to an infrared-signal receiving unit, thereby detecting the angle of the transmitting unit relative to the receiving unit with respect to a predetermined reference axis connecting both the units.

2. Description of the Related Art

Hitherto, the following type of a relative-angle detection apparatus has been suggested: an apparatus which transmits an infrared signal from an infrared-signal transmitting unit to an infrared-signal receiving unit so as to detect the angle of the transmitting unit relative to the receiving unit with respect to a predetermined reference axis connecting both the units (this axis will hereinafter referred to as "the reference axis"), based on the receiving results of the infrared signal in the receiving unit.

FIG. 4 is a block diagram of an example of the relative-angle detection apparatus of the above type. FIG. 5 is a diagram of a specific example of the arrangement of a plurality of light-emitting devices forming first and second light-emitting arrays for use in the relative-angle detection apparatus shown in FIG. 4: FIG. 5A illustrates the layout of the light-emitting devices as viewed from the front side; FIG. 5B is a sectional view taken along line 5B—5B of FIG. 5A; and FIG. 5C is a sectional view taken along line 5C—5C of FIG. 5A.

The relative-angle detection apparatus comprises, as illustrated in FIG. 4, an infrared-signal transmitting unit 31 for transmitting infrared signals and an infrared-signal receiving unit 32 for receiving the transmitted signals. The infrared-signal transmitting unit 31 includes: a signal generating section 33 for generating infrared-range frequency signals (infrared signals); a square-wave signal generating section 34 for generating square-wave signals having a 50% duty ratio at a first frequency, for example, 16 KHz; a first modulation section 35 for generating modulation signals in which infrared signals are intermittently modulated by the first-frequency square-wave signals; a second modulation section 36 for generating modulation signals in which infrared signals are intermittently modulated by the first-frequency square-wave signals; a signal dividing section 37 for dividing the modulation signal output from the second modulation section 36 into a plurality of signals, four in this example, and outputting the divided signals at different timings, and outputting the respective divided signals; a first light-emitting device array 38 formed of a plurality of light-emitting devices so as to receive the output of the first modulation section 35 and to generate continuous first infrared signals from the devices; and second light-emitting device arrays 39 each formed of a plurality of device groups, each group having a plurality of devices, so as to receive the modulation signal output from the signal dividing section 37 and to sequentially output a second infrared signal within a duration allocated to each group.

On the other hand, the infrared-signal receiving unit 32 has a plurality of light-receiving sections, three light-receiving sections 40-1, 40-2 and 40-3, in this example, formed of light-receiving devices for receiving the first and second infrared signals and voltage conversion portions for converting the output currents of the light-receiving devices into the voltages. The receiving unit 32 also includes a voltage-adding and amplifying section 41 for adding and amplifying the voltage signals obtained in the respective three light-receiving sections 40-1, 40-2 and 40-3, a detecting section 42 for detecting a first frequency component contained in the added and amplified voltage signal, a signal processing section 43 for computing the detected first frequency component so as to obtain angle information, and a display section 44 for displaying the acquired angle information.

Further, as illustrated in FIGS. 5A through 5C, the first light-emitting device array 38 is comprised of a plurality of light-emitting devices, two light-emitting devices 38-1 and 38-2 in this example, that are arranged in a direction substantially coinciding with the fiducial axis T for angle detection. The second light-emitting device arrays 39 are formed of a first group consisting of a plurality of light-emitting devices, two devices 39L-1 and 39L-2 in this example, disposed to be slightly displaced and angled in the leftward direction with respect to the fiducial axis T, a second group consisting of a plurality of light-emitting devices, two devices 39R-1 and 39R-2 in this example, located to be slightly angled in the rightward direction with respect to the fiducial axis T, a third group consisting of a plurality of light-emitting devices, two devices 39U-1 and 39U-2 in this example, positioned to be slightly angled in the upward direction with respect to the fiducial axis T, and a fourth group consisting of a plurality of light-emitting devices, two devices 39D-1 and 39D-2 in this example, located to be slightly angled in the downward direction with respect to the fiducial axis T.

FIG. 6A is a waveform diagram illustrating a modulation signal supplied to a plurality of light-emitting devices of the first light-emitting device array shown in FIG. 4, and also illustrates a modulation signal divided and supplied at different timings to a plurality of light-emitting devices of the first through fourth groups of the second light-emitting device arrays. FIG. 6B is a partially-enlarged waveform diagram of the above-described modulation signals.

An explanation will now be given of the operation of the relative-angle detection apparatus of the above known type with reference to FIGS. 3 through 6.

The infrared-signal transmitting section 33 of the infrared-signal transmitting unit 32 is first directed toward the infrared-signal receiving unit 32, and more specifically, the first and second light-emitting device arrays 38 and 39 are first directed toward the light-receiving sections 40-1 through 40-3 of the receiving unit 32, so that the transmitting and receiving units 31 and 32 can become active. In the transmitting unit 31, the signal generating section 33 generates an infrared signal to supply it to the first and second modulation sections 35 and 36, while the square-wave signal generating section 34 generates a square-wave signal having a 50% duty ratio at a first frequency, 16 KHz in this example, so as to supply it to the first and second modulation sections 35 and 36. In response to this supply, both of the first and second modulation sections 35 and 36 generate modulation signals in which the infrared signals have been intermittently modulated by the first-frequency square-wave signals, so that the output modulation signal from the first modulation section 35 can be fed to the first light-emitting device array 38, and the output modulation signal from the second modulation section 36 can be supplied to the signal dividing section 37. As illustrated in the lowermost portion (the fifth portion) of FIG. 6A, the two devices 38-1 and 38-2 of the first light-emitting device array 38 are supplied with a modulating signal having a waveform in which the infrared signal is continuously turned on and off, so that they can generate a first infrared signal having a waveform corresponding to the supplied modulation signal and project it to the infrared-signal receiving unit 32. On the other hand, the signal dividing section 37 divides the supplied modulation signal into a plurality of signals, four signals, in this example, and outputting them at different timings, so that the divided signals are respectively supplied to the first through fourth device groups, i.e., a pair of light-emitting devices 39L-1 and 39L-2, 39R-1 and 39R-2, 39U-1 and 39U-2, and 39D-1 and 39D-2, of the second light-emitting device array 39. In this case, a divided modulation signal having a waveform in which the infrared signal is turned on and off for a predetermined duration, as indicated by the uppermost portion (first portion) of FIG. 6A, is fed to the pair of light-emitting devices 39L-1 and 39L-2 of the first group, which then generate a second infrared signal having a waveform associated with the supplied modulation signal. Similarly, a divided modulation signal having a waveform in which the infrared signal is turned on and off for a predetermined duration, as represented by the second portion of FIG. 6A, is fed to the pair of light-emitting devices 39R-1 and 39R-2 of the second group, which then generate a second modulation signal having a waveform corresponding to the supplied modulation signal. Further, a divided modulation signal having a waveform in which the infrared signal is turned on and off for a predetermined duration, as designated by the third portion of FIG. 6A, is supplied to the pair of light-emitting devices 39U-1 and 39U-2 of the third group, which then produce a second modulation signal having a waveform associated with the supplied modulation signal. Moreover, a divided modulation signal having a waveform in which the infrared signal is turned on and off for a predetermined duration, as indicated by the fourth portion of FIG. 6A, is supplied to the pair of light-emitting devices 39D-1 and 39D-2 of the fourth group, which then produce a second modulation signal having a waveform associated with the supplied modulation signal. All of the second infrared signals are projected toward the receiving unit 32. The first infrared signal is projected, as shown in FIGS. 5B and 5C, in a direction substantially coinciding with the angle-detection fiducial axis T of the transmitting section 31, while the second infrared signals are projected at different timings, as illustrated in FIGS. 5B and 5C, slightly in the leftward, rightward, upward and downward directions, respectively, with respect to the axis T.

On the other hand, in the receiving unit 32, devices (not shown) of a plurality of light-receiving sections, the three light-receiving sections 40-1, 40-2 and 40-3, in this example, receive the first and second infrared signals projected from the transmitting unit 31. Then, the voltage converting portions (not shown) of the light-receiving sections 40-1, 40-2 and 40-3 convert the current signals obtained in the corresponding devices into voltage signals and supply them to the voltage-adding and amplifying section 41. After the voltage-adding and amplifying section 41 adds the supplied voltage signals at different timings, it amplifies the added signal to a predetermined voltage level and feeds it to the detecting section 42. The detecting section 42 detects a first frequency component contained in the input voltage signal and supplies it to the signal processing section 43. The signal processing section 43 executes predetermined computation on the detected first frequency component so as to obtain angle information contained in the first frequency component and to output the information to the display section 44. The display section 44 converts the supplied angle information into information suitable for display and displays the angle (inclination) of the infrared-signal transmitting unit 31 relative to the receiving unit 32 with respect to the reference axis in real time. In this manner, the angle (inclination) of the infrared-signal transmitting unit 31 relative to the receiving unit 32 with respect to the reference axis can be displayed.

In the relative-angle detection apparatus of the above-described known type, a pair of light-emitting devices 38-1 and 38-2 and one of the pairs of the light-emitting devices 39L-1 and 39L-2, 39R-1 and 39R-2, 39U-1 and 39U-2 and 39D-1 and 39D-2 are simultaneously driven and not driven. Accordingly, the detectable angle of the transmitting unit 31 relative to the receiving unit 32 with respect to the reference axis can be made wider, and also, the angle detecting operation can be stabilized.

The apparatus offers the above-described advantages on one hand, but presents the following problems on the other hand. The two devices 38-1 and 38-2 and one of the pairs of the devices 39L-1 and 39L-2, 39R-1 and 39R-2, 39U-1 and 39U-2, and 39D-1 and 39D-2 are required to be driven at the same time. This increases the current consumption of a built-in battery of the infrared-signal transmitting unit 31, which further restricts the intensity of an infrared signal projected from the transmitting unit 31, thereby limiting the range of the applications of the transmitting unit 31.

Further, the linearity for the angle detection is lowered due to a variation in the arrangements and the operational characteristics of the light-emitting devices, in particular, the displacement of the devices 38-1 and 38-2 of the first light-emitting device array 38 relative to the fiducial axis T and a variation in the luminance characteristics of the devices 38-1 and 38-2.

The foregoing problems can be solved by a relative reduction in the luminance caused by decreasing the drive current of the devices 38-1 and 38-2 of the first device array 38. It is necessary, however, to transmit a code signal to the receiving unit 32 from the transmitting unit 31 when a click switch (not shown) of the transmitting unit 31 is actuated and also to transmit a header signal for specifying the timing of supplying the divided signals. Accordingly, the luminance cannot be simply reduced in order to overcome the above drawbacks.

SUMMARY OF THE INVENTION

Accordingly, it is an object of the present invention to provide a relative-angle detection apparatus, free from the above-described problems, which decreases the current consumption of a built-in battery of an infrared-signal transmitting unit without impairing a reduction in the luminance required when signals, such as code signals and the like, are transmitted.

In order to achieve the above object, according to the present invention, there is provided a relative-angle detection apparatus comprising an infrared-signal transmitting unit and an infrared-signal receiving unit, the infrared-signal transmitting unit including a first light-emitting device array formed of a plurality of light-emitting devices disposed in a direction substantially coinciding with the fiducial axis used for angle detection, and a second light-emitting device array formed of a plurality of light-emitting devices disposed to be slightly angled in different directions with respect to the fiducial axis, wherein the plurality of light-emitting devices of the first light-emitting device array generate a continuously-output first infrared signal in which an infrared signal is intermittently modulated by a first frequency and also modulated by a second frequency higher than the first frequency, while the light-emitting devices of the second light-emitting device array generate a second infrared signal in which an infrared signal is modulated by the first frequency and also divided into a plurality of signals so as to be output at different timings, and wherein the infrared-signal receiving unit has means for detecting and amplifying the first frequency contained in the received first and second infrared signals and executing signal-processing on the amplified first frequency, thereby detecting the angle of the infrared-signal transmitting unit relative to the infrared-signal receiving unit with respect to the reference axis.

With this arrangement, the light-emitting devices of the first light-emitting device array are driven by a signal having a waveform in which an infrared signal is first modulated by the square-wave signal at the second frequency higher than the first frequency and then intermittently modulated by the first-frequency square-wave signal, i.e., a waveform in which the infrared signal is turned on and off with the first-frequency square-wave signal and also turned on and off with the second-frequency square-wave signal when the signal is in the active state. In response to this drive signal, the light-emitting devices generate a first infrared signal having a waveform similar to that of the drive signal. Hence, time in which the devices of the first light-emitting device array and one of the pairs of the devices of the second light-emitting device array are concurrently driven can be reduced to one half of the time required for the relative-angle detection apparatus of the known type. This decreases the current consumption of a built-in battery of the infrared-signal transmitting unit.

Additionally, the current consumption is reduced as described above, thereby obviating the need for decreasing the luminance of the first infrared signal in order to increase battery life. Hence, as in the relative-angle detection apparatus of the known type, code signals and header signals can be transmitted to the infrared-signal receiving unit from the transmitting unit without suffering signal loss.

BRIEF DESCRIPTION OF THE DRAWINGS

FIGS. 6A and 6B are waveform diagram illustrating the states of modulation signals supplied to the first and second light-emitting device arrays, respectively, of the infrared-signal transmitting unit shown in FIG. 4.

DESCRIPTION OF THE PREFERRED EMBODIMENT

Figure 1:
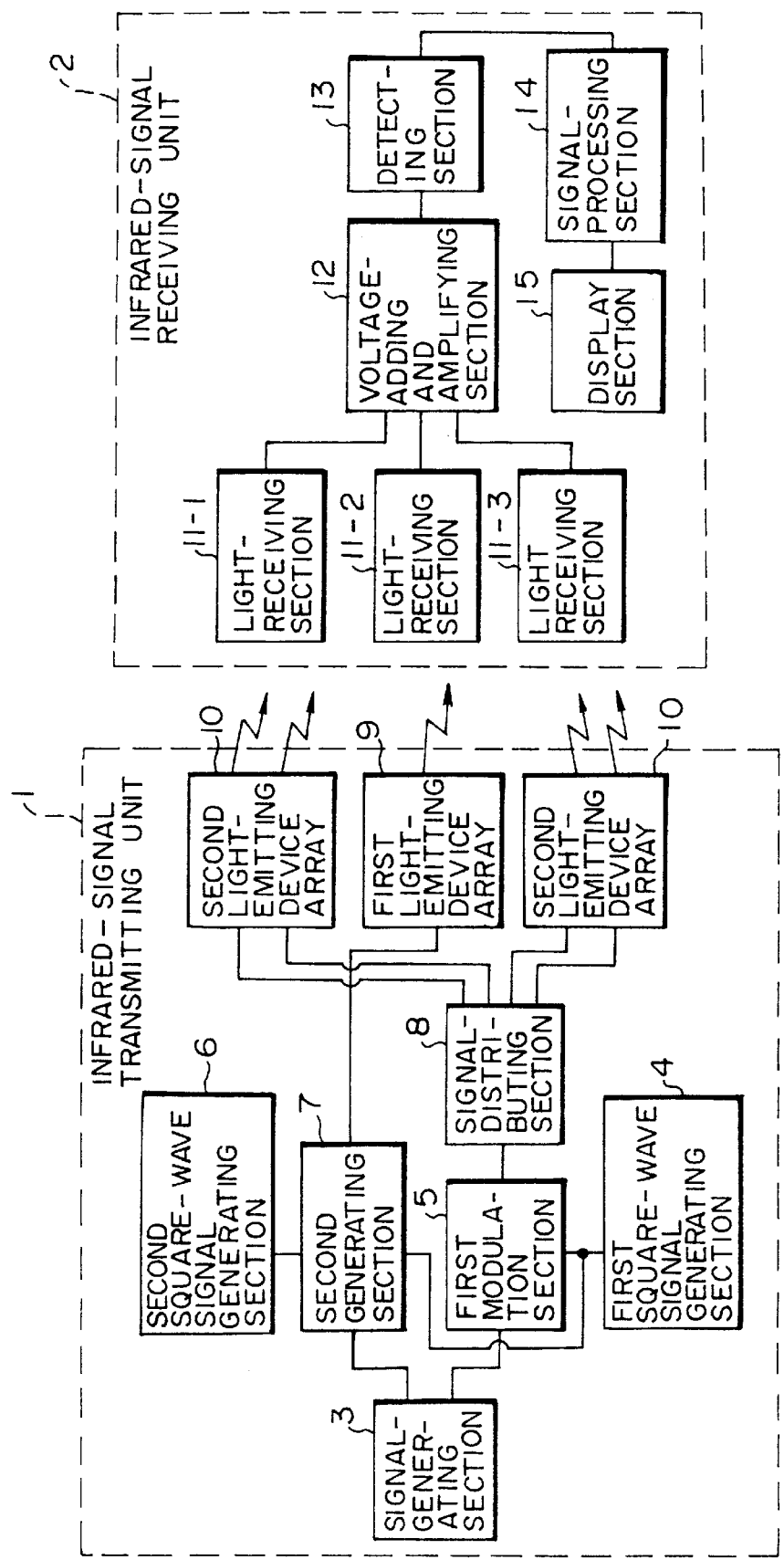
FIG. 1 is a block diagram of an embodiment of a relative-angle detection apparatus according to the present invention.
Figure 2A:
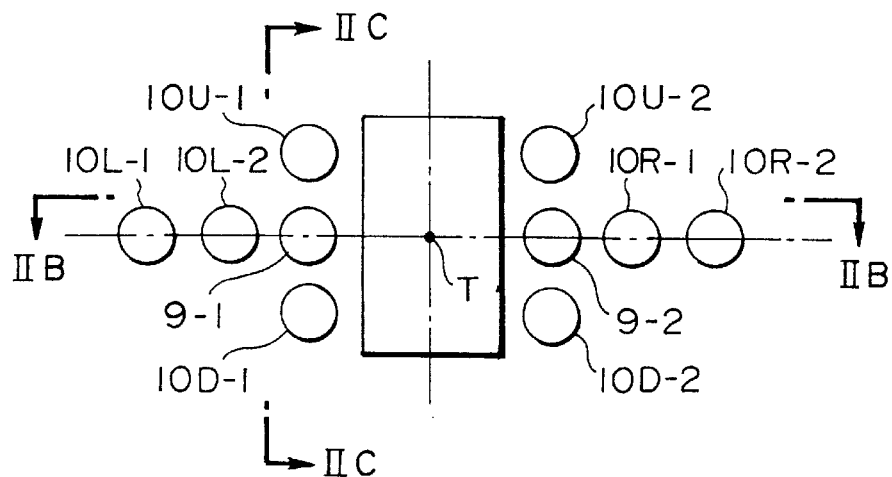
FIGS. 2A, 2B and 2C are diagrams showing an example of the specific arrangement of a plurality of light-emitting devices forming first and second light-emitting device arrays for use in the relative-angle detection apparatus shown in FIG. 1.
Figure 2B:
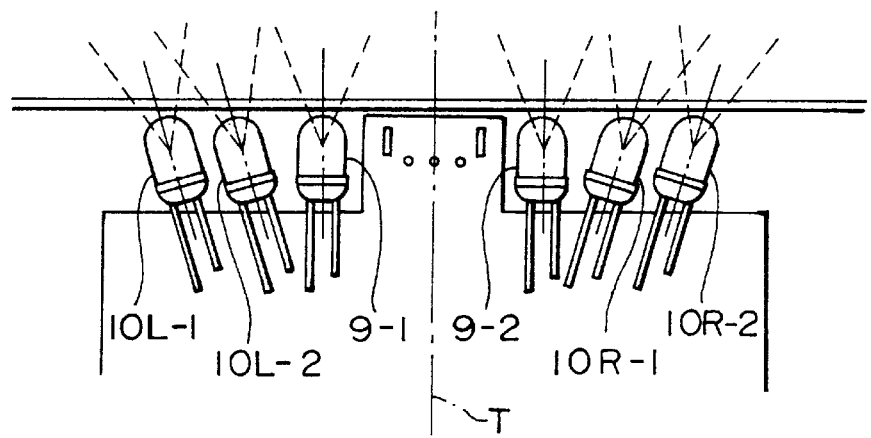
Figure 2C:
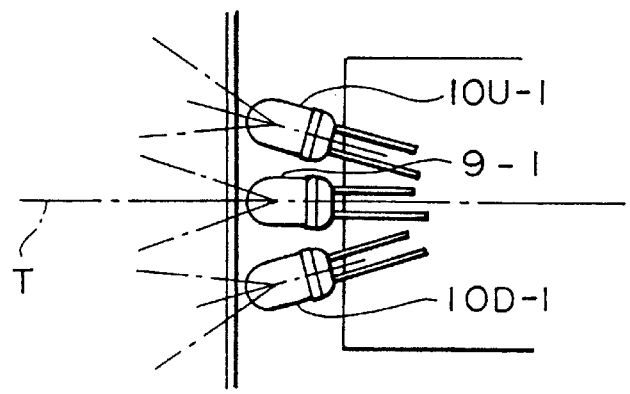

FIG. 1 is a block diagram of an embodiment of a relative-angle detection apparatus according to the present invention. FIG. 2, which is comprised of FIGS. 2A through 2C, is a diagram illustrating an example of specific arrangement of a plurality of light-emitting devices forming first and second device arrays for use in the apparatus shown in FIG. 1: FIG. 2A illustrates the layout of the devices as viewed from the front side; FIG. 2B is a sectional view taken along line 2B—2B of FIG. 2A; and FIG. 2C is a sectional view taken along line 2C—2C of FIG. 2A.

Figure 4:
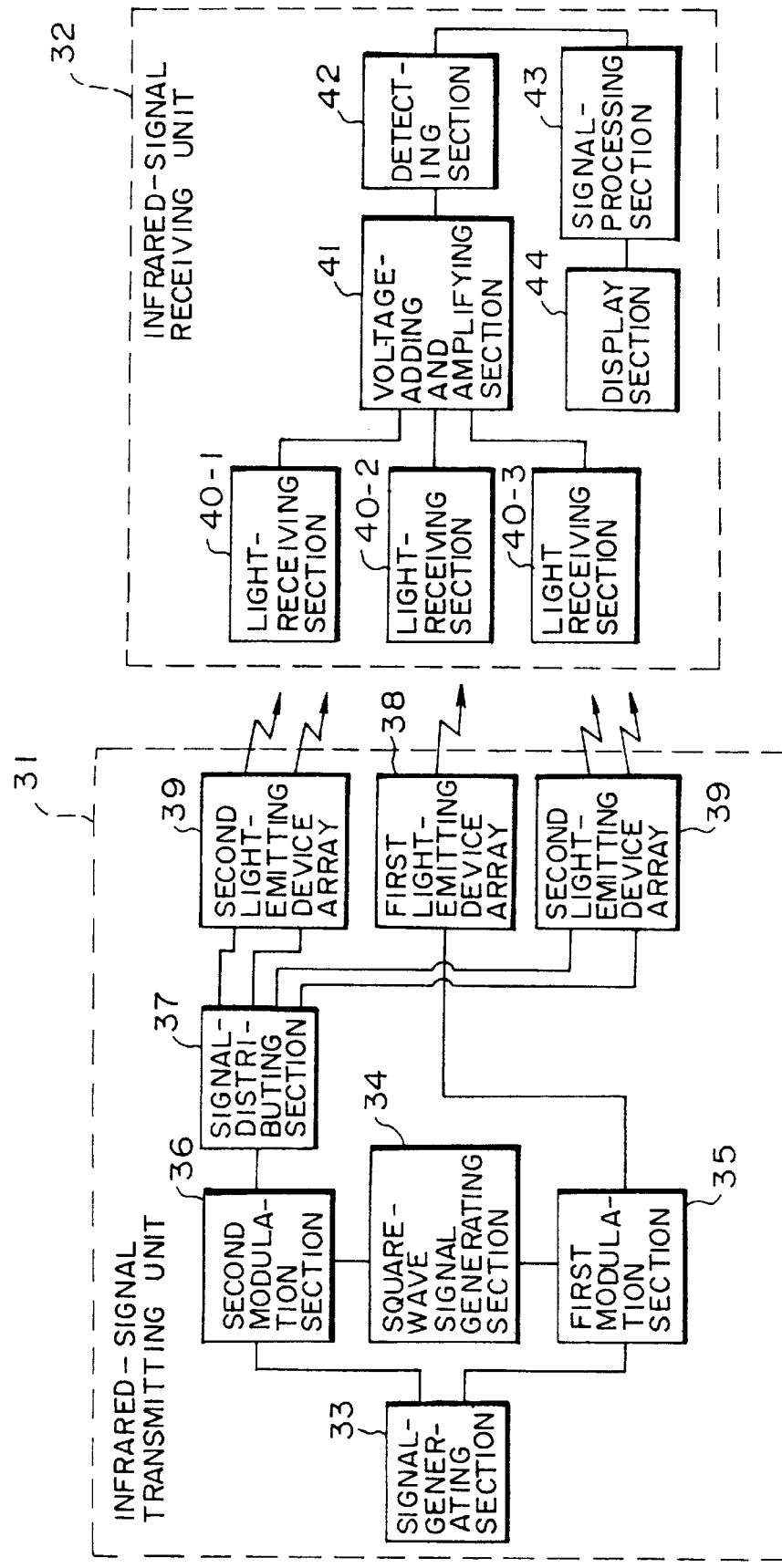
FIG. 4 is a block diagram of an example of a relative-angle detection apparatus of the known type.
Figure 5A:
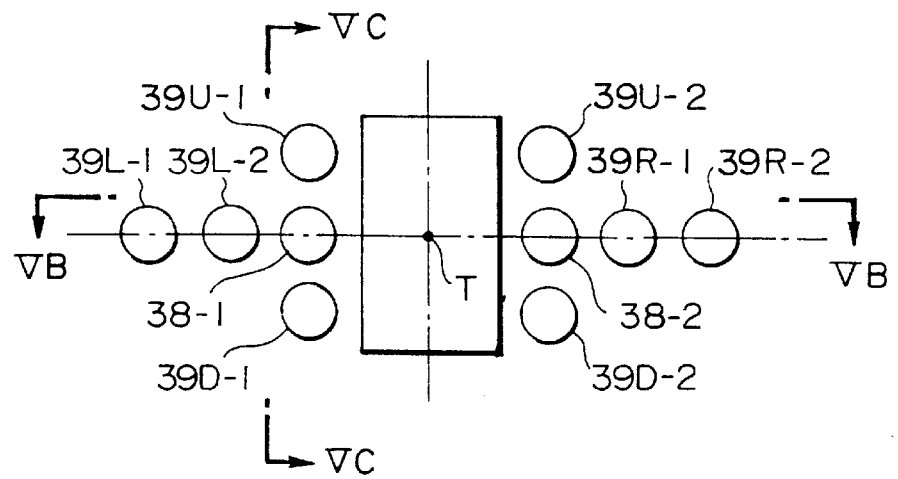
FIGS. 5A, 5B and 5C are diagrams showing an example of the specific arrangement of a plurality of light-emitting devices forming first and second light-emitting device arrays for use in the relative-angle detection apparatus shown in FIG. 4.
Figure 5B:
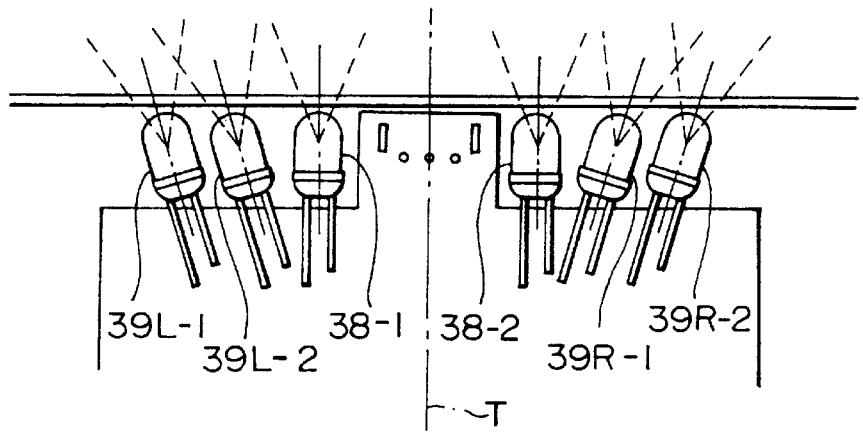
Figure 5C:
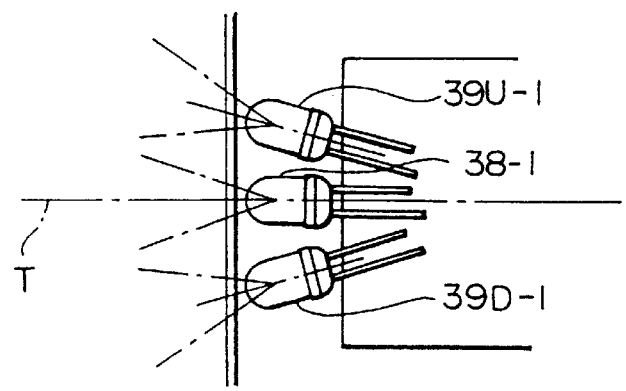

The construction and the operation of this embodiment shown in FIG. 1 is largely similar to that of the known apparatus shown in FIG. 4. In this embodiment, however, improvements to the overall construction and operation including those discussed above will be described.

The relative-angle detection apparatus comprises, as illustrated in FIG. 1, an infrared-signal transmitting unit 1 for transmitting infrared signals and an infrared-signal receiving unit 2 for receiving the transmitted infrared signals. The transmitting unit 1 includes: a signal generating section 3 for generating infrared-range frequency signals (infrared signals); a first square-wave signal generating section 4 for generating square-wave signals having a 50% duty ratio, at a first frequency, for example, 16 KHz; a first modulation section 5 for generating a first modulation signal in which an infrared signal is intermittently modulated by the first-frequency square-wave signal; a second square-wave signal generating section 6 for generating a square-wave signal having a 50% duty ratio at a second frequency higher than the first frequency, for example, 500 KHz; a second modulation section 7 for generating a second modulation signal in which an infrared signal is modulated by the second-frequency square-wave signal and then further intermittently modulated by the first-frequency square-wave signal; a signal dividing section 8 for dividing the first modulation signal, four signals in this embodiment, and outputting the respective divided signals at different timings; a first light-emitting device array 9 formed of a plurality of light-emitting devices to be supplied with the second modulation signal so as to generate a continuous first infrared signal from the devices; and a second light-emitting device arrays 10 formed of a plurality of device groups, each group having a plurality of light-emitting devices to be supplied with the divided first modulation signals at different timings so as to sequentially generate second infrared signals within a duration allocated to each group.

On the other hand, the infrared-signal receiving unit 2 has a plurality of light-receiving sections, three sections 11-1, 11-2 and 11-3, in this embodiment, each section formed of light-receiving devices for receiving the first and second infrared signals and a voltage-converting portion for converting a current output from each light-receiving device into a voltage. The receiving unit 2 also includes a voltage-adding and amplifying section 12 for adding and amplifying the voltage signals obtained in the respective receiving sections 11-1, 11-2 and 11-3, a detecting section 13 for detecting a first frequency component contained in the added and amplified voltage signal, a signal processing section 14 for computing the detected first frequency component so as to acquire angle information, and a display section 15 for displaying the obtained angle information.

Further, as illustrated in FIGS. 2A through 2C, the first light-emitting device array 9 is formed of a plurality of devices, two devices 9-1 and 9-2 in this embodiment, disposed in a direction substantially coinciding with the angle-detection fiducial axis T. The second device arrays 10 are comprised of a first group consisting of a plurality of light-emitting devices, two devices 10L-1 and 10L-2 in this embodiment, disposed to be slightly angled in the leftward direction with respect to the fiducial axis T, a second group consisting of a plurality of light-emitting devices, two devices 10R-1 and 10R-2 in this embodiment, located to be slightly angled in the rightward direction with respect to the fiducial axis T, a third group consisting of a plurality of light-emitting devices, two devices 10U-1 and 10U-2 in this embodiment, positioned to be slightly angled in the upward direction with respect to the fiducial axis T, and a fourth group consisting of a plurality of light-emitting devices, two devices 10D-1 and 10D-2 in this embodiment, located to be slightly angled in the downward direction with respect to the fiducial axis T.

Figure 3A:
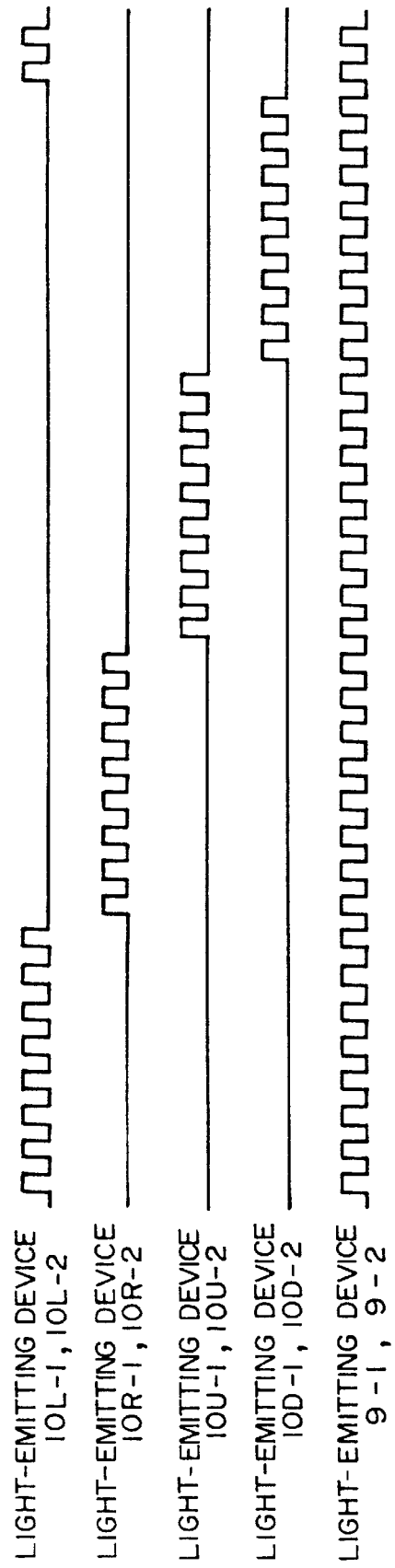
FIGS. 3A and 3B are waveform diagrams illustrating the states of second and first modulation signals supplied to the first and second light-emitting device arrays, respectively, of the infrared-signal transmitting unit shown in FIG. 1.
Figure 3B:
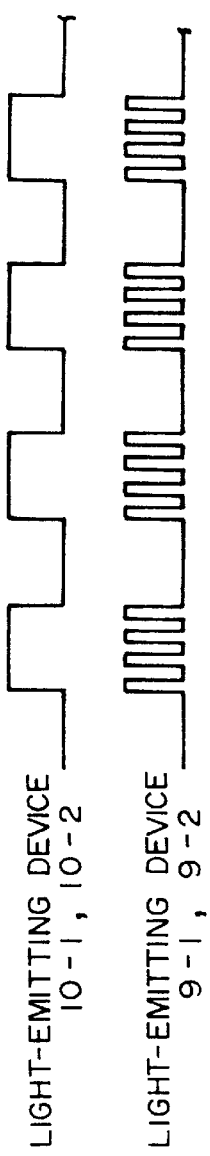

FIG. 3A is a waveform diagram illustrating the state of the second modulation signal supplied to a plurality of light-emitting devices of the first light-emitting device array of the infrared-signal transmitting unit shown in FIG. 1, and also illustrates the states of the modulation signals divided and supplied at different timings to a plurality of light-emitting devices of the first through fourth groups of the second light-emitting device array. FIG. 3B is a partially-enlarged waveform diagram of the above-described modulation signals.

An explanation will now be given of the operation of the relative-angle detection apparatus of this embodiment with reference to FIGS. 1 through 3.

The first and second light-emitting arrays 9 and 10 of the infrared-signal transmitting unit 1 are first directed toward a plurality of light-receiving devices of the light-receiving unit 2, so that the transmitting unit 1 and the receiving unit 2 can become active. At this time, in the transmitting unit 1, the signal processing section 3 generates an infrared signal and supplies it to the first and second modulation section 5 and 7, while the square-wave signal generating section 4 generates a square-wave signal having a 50% duty ratio at a first frequency, 16 KHz in this embodiment, and also supplies it to the first and second modulation sections 5 and 7. Upon receiving the smooth sinusoidal infrared signal and the first-frequency square-wave signal, the first modulation section 5 produces a first modulation signal having a waveform in which the infrared signal is intermittently modulated by the first-frequency square-wave signal, i.e, a waveform in which the infrared signal is turned on and off by the first-frequency square-wave signal, so as to supply the modulation signal to the signal dividing section 8. On the other hand, upon receiving the infrared signal and the first and second-frequency square-wave signals, the second modulation section 7 generates a second modulation signal having a waveform in which the infrared signal is first modulated by the second square-wave signal and then turned on and off by the first-frequency square-wave signal, i.e., a waveform in which the infrared signal is turned on and off by the first-frequency square-wave signal and also turned on and off by the second-frequency square-wave signal when it is in the active state, as indicated by the lowermost portion (the fifth portion) of FIG. 3A and also, in detail, by the lower portion of FIG. 3B. The second modulation signal is then supplied to the first light-emitting device array 9. In response to the supply of the second modulation signal, the two light-emitting devices 9-1 and 9-2 of the device array 9 produce a first infrared signal having a waveform similar to the second modulation signal and projects it to the infrared-signal receiving unit 2. Meanwhile, the signal processing section 8 divides the supplied first modulation signal into a plurality of signals, four signals in this embodiment, so as to supply them at different timings to the pairs of light-emitting devices 10L-1 and 10L-2, 10R-1 and 10R-2, 10U-1 and 10U-2, and 10D-1 and 10D-2 of the first through fourth groups, respectively, of the second light-emitting device arrays 10. At this time, a first divided modulation signal having a waveform in which the infrared signal is turned on and off for a predetermined time, as indicated by the uppermost portion (the first portion) of FIG. 3A, is fed to the devices 10L-1 and 10L-2 of the first device group, which then generate a second infrared signal having a waveform corresponding to the supplied first modulation signal only while the first modulation signal is fed to the devices 10L-1 and 10L-2. Similarly, a first divided modulation signal having a waveform in which the infrared signal is turned on and off for a predetermined time, as represented by the second portion of FIG. 3A, is supplied to the devices 10R-1 and 10R-2 of the second device group, which then produce a second infrared signal having a waveform associated with the supplied first modulation signal only while the first modulation signal is supplied to the devices 10R-1 and 10R-2. Moreover, a first divided modulation signal having a waveform in which the infrared signal is turned on and off for a predetermined time, as designated by the third portion of FIG. 3A, is supplied to the devices 10U-1 and 10U-2 of the third device group, which then generate a second infrared signal having a waveform corresponding to the supplied first modulation signal only while the first modulation signal is fed to the devices 10U-1 and 10U-2. Further, a first divided modulation signal having a waveform in which the infrared signal is turned on and off for a predetermined time, as indicated by the fourth portion of FIG. 3A, is fed to the devices 10D-1 and 10D-2 of the fourth device group, which then generate a second infrared signal having a waveform corresponding to the supplied first modulation signal only while the first modulation signal is fed to the devices 10D-1 and 10D-2. All of the second infrared signals are projected toward the infrared-signal receiving unit 2. As in the known apparatus, the first infrared signal is projected, as illustrated in FIGS. 2B and 2C, in the direction substantially coinciding with the angle-detection fiducial axis T of the transmitting unit 1, while the second infrared signals are projected at different timings, as shown in FIGS. 2B and 2C, to be slightly angled in the leftward, rightward, upward and downward direction, respectively, with respect to the axis T.

On the other hand, in the infrared-signal receiving unit 2, the light-receiving devices (not shown) of a plurality of light-receiving sections, the three sections 11-1, 11-2 and 11-3 in this embodiment, receive the first and second infrared signals projected from the transmitting unit 1. Then, the voltage converting portions (not shown) of the three sections 11-1, 11-2 and 11-3 convert the current signals obtained in the corresponding devices into voltage signals and supply them to the voltage-adding and amplifying section 12. After the voltage-adding and amplifying section 12 adds the supplied voltage signals at different timings, it amplifies the added signal to a predetermined voltage level and feeds it to the detecting section 13. The detecting section 13 detects a first frequency component contained in the input voltage signal and supplies it to the signal processing section 14. The signal processing section 14 executes predetermined computation on the detected first frequency component so as to obtain angle information contained in the first frequency component and to output the information to the display section 15. The display section 15 converts the supplied angle information into information suitable for display and displays the angle (inclination) of the infrared-signal transmitting unit 1 relative to the receiving unit 2 with respect to the reference axis in real time. In this manner, the angle (inclination) of the infrared-signal transmitting unit 1 relative to the receiving unit 2 with respect to the reference axis can be displayed.

As discussed above, according to the relative-angle detection apparatus of this embodiment, the second modulation signal for driving the devices 9-1 and 9-2 of the first light-emitting device array 9 has a waveform obtained by the following procedure. After the infrared signal is modulated by the second-frequency square-wave signal, the modulation signal is further intermittently modulated by the first-frequency square-wave signal, i.e., the infrared signal is turned on and off with the first-frequency square-wave signal and also turned on and off with the second-frequency square-wave signal when it is in the active state. The first infrared signal output from the devices 9-1 and 9-2 also has a waveform similar to that of the second modulation signal. Consequently, time in which the light-emitting devices 9-1 and 9-2 and one of the pairs 10L-1 and 10L-2, 10R-1 and 10R-2, 10U-1 and 10U-2, and 10D-1 and 10D-2 of the second light-emitting device array 10 are concurrently driven is reduced to one half of the time required for the apparatus of the known type. As a result, the current consumption of a built-in battery of the transmitting unit 1 can be lowered.

Moreover, the current consumption can be reduced as described above, thereby eliminating the need for decreasing the luminance of the first infrared signal transmitted from the devices 9-1 and 9-2 of the first device array 9 in order to increase battery life. Additionally, signals, such as a code signal transmitted to the receiving unit 2 from the transmitting unit 1 when a click switch is actuated and a header signal for designating the timing of supplying the divided signals, can be transmitted while the first infrared signal is in the active state. As a consequence, in this apparatus, as well as in the apparatus of the known type, signals, such as code signals and header signals, can be transmitted to the receiving unit 2 from the transmitting unit 1 without suffering signal loss.

Further, the duty ratio of the second-frequency square-wave signal can be varied to substantially change the luminance intensity of the first infrared signal while the drive current of the devices 9-1 and 9-2 of the first light-emitting device array 9 are made constant. This does not produce any influence on the code signal and header signal transmitted to the receiving unit 2 from the transmitting unit 1.

As will be clearly understood from the foregoing description, the present invention offers the following advantages.

The light-emitting devices of the first light-emitting device array are driven by a signal having a waveform in which a smooth sinusoidal infrared signal is first modulated by a square-wave signal at a second frequency higher than the first frequency and then intermittently modulated by the first-frequency square-wave signal, i.e., a waveform in which the infrared signal is turned on and off with the first-frequency square-wave signal and also turned on and off with the second-frequency square-wave signal when the infrared signal is in the active state. In response to this drive signal, the light-emitting devices generate a first infrared signal having a waveform similar to that of the drive signal. With this arrangement, time in which the devices of the first light-emitting device array and one of the pairs of the devices of the second light-emitting device arrays are concurrently driven can be reduced to one half of the time required for the relative-angle detection apparatus of the known type. This decreases the current consumption of a built-in battery of the infrared-signal transmitting unit.

Additionally, the current consumption is reduced as described above, thereby obviating the need for decreasing the luminance of the first infrared signal in order to increase battery life. Hence, as in the relative-angle detection apparatus of the known type, code signals and header signals can be transmitted to the infrared-signal receiving unit from the transmitting unit without suffering signal loss.

What is claimed is:

1. A relative-angle detection apparatus comprising:
    an infrared-signal transmitting unit including a first light-emitting device array formed from a plurality of light-emitting devices disposed in a direction substantially coinciding with a fiducial axis used for angle detection, and a second light-emitting device array formed from of a plurality of light-emitting devices disposed at an angle to said fiducial axis different from that of said first light-emitting device array, wherein said plurality of light-emitting devices of said first light-emitting device array generate a continuously-output first infrared signal which is intermittently modulated by a first frequency and a second frequency higher than said first frequency, said light-emitting devices of said second light-emitting device array generate second infrared signals which are modulated by said first frequency and output at different timings from selected groups of said light-emitting devices of said second light-emitting device array, and
    an infrared-signal receiving unit that detects and amplifies the first frequency of the first and second infrared signals and processes the amplified first frequency, thereby detecting the angle of said infrared-signal transmitting unit relative to said infrared-signal receiving unit with respect to the fiducial axis.

2. The relative-angle detection apparatus according to claim 1, wherein said infrared-signal transmitting unit comprises a signal processing section for generating an infrared-range frequency signal and a signal dividing section.

3. The relative-angle detection apparatus according to claim 2 wherein said signal processing section further comprises a first modulation section for generating a first modulation signal having an infrared-range frequency signal modulated by the by the first frequency and a second modulation section for generating a second modulation signal in which the infrared-range frequency signal is modulated by the second higher frequency higher than the first frequency and intermittently modulated by the first frequency.

4. The relative-angle detection apparatus according to claim 3 wherein the signal dividing section divides said first modulation signal into a plurality of signals and outputs the divided signals at different timings, wherein the divided signals from said signal dividing section are supplied to the respective light-emitting devices of said second light-emitting device array, and the second modulation signal from said second modulation section is supplied to the light-emitting devices of said first light-emitting device array.

5. A relative-angle detection apparatus according to claim 1, wherein said infrared-signal receiving unit comprises a plurality of light-receiving sections having light-receiving devices that receive said first and second infrared signals, an amplifying section for amplifying said first and second infrared signals received in said plurality of receiving sections, a detecting section for selectively detecting the first frequency contained in the amplified signals, and a signal processing section for computing the detected first frequency so as to generate angle information.

* * * * *

UNITED STATES PATENT AND TRADEMARK OFFICE
CERTIFICATE OF CORRECTION

PATENT NO. : 5,835,209
DATED : November 10, 1998
INVENTOR(S) : Yuichi Umeda et al.

It is certified that error appears in the above-indentified patent and that said Letters Patent is hereby corrected as shown below:

<u>In the Title Page</u>

In column 2, line 10, under "ABSTRACT" replace "continously" with --continuously--.

<u>In the Claims</u>

In Claim 3, line 5, delete "by the" second occurrence.

Signed and Sealed this

Eighteenth Day of May, 1999

Attest:

*Attesting Officer*

Q. TODD DICKINSON

*Acting Commissioner of Patents and Trademarks*